UNITED STATES PATENT OFFICE.

ALBRECHT SCHMIDT AND ADOLF STEINDORFF, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY.

LEUCO COMPOUNDS AND PROCESS OF MAKING SAME.

1,141,148.     Specification of Letters Patent.     Patented June 1, 1915.

No Drawing.     Application filed December 6, 1911. Serial No. 664,182.

*To all whom it may concern:*

Be it known that we, ALBRECHT SCHMIDT, Ph. D., chemist, and ADOLF STEINDORFF, Ph. D., chemist, citizens of the Empire of Germany, residing at Höchst-on-the-Main, Germany, have invented certain new and useful Improvements in New Leuco Compounds and Processes of Making Same, of which the following is a specification.

The vat-dyestuffs which, according to German Patents Nos. 222640, 224590 and 224591, are derived from carbazol or its N-alkyl, or N-aryl-substitution products, for instance the hydron blue G, and which are comprised under the collective term dyestuffs of the "hydron-blue series", described hereinafter, are with difficulty reduced by by the addition of hydrosulfite to the dyebath or to the stock-vat, and consume a great quantity of hydrosulfite in the preparation of such vats. "Hydronblue G" is a sulfurization product of alkyl-carbazol-indophenol, having the formula

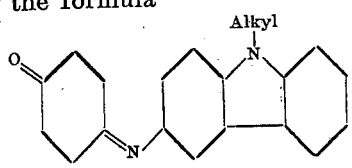

and the "hydronblue" series are sulfurization products of carbazol-indophenol and their alkyl-substitution products, as shown by the formula—

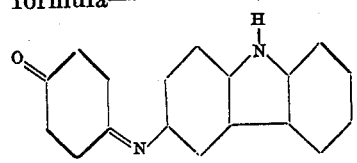

which represents "hydronblue R," and by substitution the group N—H becomes N—$C_2H_5$, thereby forming "hydronblue G." Now we have found that it is advantageous not to prepare the leuco compounds of the said dyestuffs of the "hydronblue series" at the place where they are used, and where there are available only comparatively weak and therefore disadvantageous reducing agents, but that it is preferable to effect the reduction during the manufacture, for instance by using highly concentrated solutions, in which case also cheap reducing-agents, such as hydrosulfite-lye, or the like may be employed. We have further found that the leuco compounds thus obtained, which are as such unfit for transport, can be converted into a stable concentrated form by incorporating non-drying, water-soluble bodies into the leuco compounds of the dyestuffs described in German Patents Nos. 222640, 224590, and 224591 (including the leuco salts of these dyestuffs), which compounds are produced by reduction either by means of hydrosulfite or by another reducing agent. Suitable substances soluble in water and not easily dried up, are the carbohydrates, for instance molasses, syrup, glucose, invert-sugar, dextrin or the like. Equally good results are obtained by using instead of the said substances their technical equivalents, for instance glycerin, wood-molasses, that is to say sulfite-pitch, or the like. Therefore in our present application the term "carbohydrates" comprises not only the carbohydrates themselves but also their technical equivalents. The incorporation may be effected either by simply mixing the said leuco compounds, or the corresponding leuco salts, with the additional substances, or by drying them up together with the latter, or by using as reducing agents the additional substances themselves so far as they have reducing power, for instance glucose, in the place of which may also be used its technical equivalents, such, for instance, as wood-molasses, that is to say sulfite-pitch, or the like, by which the same result is obtained.

Example I: 100 parts by weight of the leuco compounds obtained from the vat-dyestuffs described in German Patents Nos. 222640, 224590, and 224591, for instance 100 parts of the leuco compound of the dyestuff obtained from nitrosophenol and methyl or ethyl carbazol, are mixed in the form of a highly concentrated press-cake with 80 parts of molasses, treacle (syrup), glucose, glycerin or the like. The product thus obtained is fit for transport, keeps for an indefinite time and can be directly used for dyeing on addition of alkali and, if required, of hydrosulfite. If for the free leuco compounds their alkali salts are substituted, there are directly obtained stable vats of high concentration. By evaporating them *in vacuo* to dryness, the products are obtained in a solid form. We have, moreover, found that the above-described products, particularly the alkaline leuco salts, can be very advantageously prepared by heating the dyestuffs described in German Patents Nos. 222640, 224590, and 224591 with glucose and caustic alkali or their technical equivalents, and evaporating to siccity the reduction products thus obtained. These products when dissolved in water are suitable for dyeing, almost without the addition of hydrosulfite, and possess the tinctorial power of the primary paste after reduction with hydrosulfite.

Example II: 500 grams of hydron blue paste G of 20% strength are stirred, while heating, in presence of 150 grams of glucose and 100 grams of caustic soda lye of 40° Bé. and, if required, evaporated *in vacuo* to siccity. Thus a brown friable product is obtained which can be directly used for dyeing, if required, with the addition of some hydrosulfite or glucose, the addition of the latter being preferable for the fermentation-vat or the glucose vat.

Having now described our invention, what we claim is:

1. The herein-described process of making stable concentrated preparations of leuco compounds and their alkali salts of the dyestuffs of the "hydron-blue" series, which consists in incorporating with said leuco compounds bodies which do not readily dry up and are soluble in water.

2. The herein-described process of making stable concentrated preparations of leuco compounds and their alkali salts of the dyestuffs of the "hydron-blue" series, which consists in incorporating with said leuco compounds organic reducing agents which do not readily dry up and are soluble in water.

3. The herein-described process of making stable concentrated preparations of leuco compounds and their alkali salts of the dyestuffs of the "hydron-blue" series, which consists in incorporating with said leuco compounds water-soluble carbohydrates.

4. The herein-described process of making stable concentrated preparations of leuco-compound alkali salts of the dyestuffs of the "hydron-blue" series, which consists in heating the dyestuff with glucose and alkali hydrates.

5. The herein-described process of making stable concentrated preparations of leuco-compound alkali salts of the dyestuffs of the "hydron-blue" series, which consists in heating the dyestuff with glucose and alkali-hydrates, and evaporating to dryness.

6. As new products, the stable concentrated preparations of leuco compounds and their alkali salts of the dyestuffs of the "hydron-blue" series, said preparations being soluble in water and diluted alkalis, depositing when oxidized with air the dyestuffs of the "hydron-blue" series, and yielding on such oxidation and on filtration a filtrate which shows the properties of a solution in water of a carbohydrate heated with an alkali hydrate.

In testimony whereof, we affix our signatures in presence of two witnesses.

ALBRECHT SCHMIDT.
ADOLF STEINDORFF.

Witnesses:
 JEAN GRUND,
 CARL GRUND.